(12) United States Patent
Saville et al.

(10) Patent No.: US 9,556,899 B2
(45) Date of Patent: Jan. 31, 2017

(54) HIGH STRENGTH FOIL JOURNAL BEARING RETAINER

(71) Applicant: HONEYWELL INTERNATIONAL INC., Morristown, NJ (US)

(72) Inventors: Marshall Saville, Torrance, CA (US); Keith Alan Hurley, Garden Grove, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 6 days.

(21) Appl. No.: 14/680,628

(22) Filed: Apr. 7, 2015

(65) Prior Publication Data

US 2015/0211571 A1 Jul. 30, 2015

Related U.S. Application Data

(63) Continuation-in-part of application No. 13/745,785, filed on Jan. 19, 2013, now Pat. No. 9,057,401.

(51) Int. Cl.
F16C 17/02 (2006.01)
F16C 43/02 (2006.01)

(52) U.S. Cl.
CPC ............ *F16C 17/024* (2013.01); *F16C 43/02* (2013.01); *Y10T 29/49639* (2015.01); *Y10T 29/49696* (2015.01); *Y10T 29/49826* (2015.01)

(58) Field of Classification Search
CPC ....... F16C 17/024; F16C 17/042; F16C 43/02; F16C 27/02; F16C 32/0607; F16C 2360/24; Y10T 29/49639; Y10T 29/49696; Y10T 29/49826
See application file for complete search history.

(56) References Cited

U.S. PATENT DOCUMENTS

| | | | |
|---|---|---|---|
| 3,809,443 A | 5/1974 | Cherubim |
| 3,893,733 A | 7/1975 | Silver et al. |
| 4,415,280 A | 11/1983 | Agrawal |
| 4,475,824 A | 10/1984 | Glaser et al. |
| 5,228,785 A | 7/1993 | Saville et al. |
| 5,427,455 A | 6/1995 | Bosley |
| 5,519,274 A | 5/1996 | Scharrer |
| 5,634,723 A | 6/1997 | Agrawal |
| 5,911,511 A | 6/1999 | Saville |

(Continued)

FOREIGN PATENT DOCUMENTS

DE 2361226 A1 7/1974

OTHER PUBLICATIONS

Examination Report dated Jul. 4, 2014 received in EP Application No. 14150483.7.

(Continued)

*Primary Examiner* — Alan B Waits
(74) *Attorney, Agent, or Firm* — Shimokaji IP

(57) ABSTRACT

A journal foil bearing includes a bearing retainer having one slot configured to receive a top foil leading edge tab and another slot configured to receive a top foil trailing edge tab. A backup support structure, integral to the bearing retainer, extends between and is at least partially defined by the slots. The retainer is configured so that, during operation, the trailing edge tab further contacts, at an increased contact pressure, the support structure at a position close to the friction force, thereby minimizing top foil bending stress and improving bearing strength.

6 Claims, 2 Drawing Sheets

(56) References Cited

U.S. PATENT DOCUMENTS

| | | | |
|---|---|---|---|
| 5,915,841 A | 6/1999 | Weissert | |
| 6,135,640 A | 10/2000 | Nadjafi | |
| 7,553,086 B2 | 6/2009 | Kang et al. | |
| 8,029,194 B2 | 10/2011 | Agrawal et al. | |
| 8,353,631 B2 * | 1/2013 | Kim | F16C 17/024 384/103 |
| 8,500,331 B2 | 8/2013 | Kim et al. | |
| 9,028,149 B2 * | 5/2015 | Rosen | F16C 17/024 384/103 |
| 9,109,622 B2 * | 8/2015 | Meacham | F16C 33/02 |
| 2006/0018574 A1 * | 1/2006 | Kang | F16C 17/024 384/106 |
| 2011/0052110 A1 * | 3/2011 | Kim | F16C 17/024 384/106 |
| 2015/0030269 A1 * | 1/2015 | Omori | F16C 17/024 384/103 |
| 2015/0159689 A1 * | 6/2015 | Omori | F16C 17/024 384/103 |
| 2015/0337894 A1 * | 11/2015 | Yoshino | F16C 17/024 384/103 |

OTHER PUBLICATIONS

Search Report dated Jun. 16, 2014 received in EP Application No. 14150483.7.

\* cited by examiner

HIGH STRENGTH FOIL JOURNAL BEARING RETAINER

BACKGROUND OF THE INVENTION

The present invention generally relates to foil journal bearings and, more particularly, to foil journal bearing retainers.

A foil journal bearing may be a fluid film hydrodynamic bearing and may be used to support a high speed rotating member, such as a shaft. The foil journal bearing, which may be configured to enclose the rotating member, may include a close-fitting, compliant, annular element such as a thin foil encased within a stationary retaining member. Rotation of the shaft within the retaining member may form and maintain a pressurized fluid film between the shaft and the compliant foil. High speed rotation of the shaft may generate a high pressure in the fluid film and this pressurized fluid film may support the load imposed by the shaft.

The compliant foil, such as a top foil, may be secured to the retaining member by edge tabs, also referred to as retaining tabs. The word "compliant" may be defined as "yielding" and a compliant foil may be a foil that is configured to yield, for example, to the pressurized fluid film. A resilient backing member, such as a spring foil, may be disposed between the top foil and the retaining member to accommodate deflections of the foil resulting from pressurization, centrifugal forces and temperature differentials in order to maintain adequate film layer geometry. For some applications, a second compliant foil, such as an under foil, may be disposed between the top foil and the spring foil.

During operation, foil journal bearings can experience high circumferential forces when the fluid film is compromised in an overload condition. These forces are transmitted to the top foil retaining tab and produce a high bending moment and subsequent stress in the top foil that can permanently distort the tab, affect bearing performance and shorten bearing life.

As can be seen, a higher strength retaining design is needed that will prevent loss in bearing performance and shortened bearing life. The design must be simple to minimize manufacturing cost.

SUMMARY OF THE INVENTION

In one aspect of the present invention, an apparatus forming a foil journal bearing comprises a retainer member having an inner surface that defines an opening, said opening configured to receive a rotatable member; a top foil trailing edge tab slot extending into said retainer member; a top foil leading edge tab slot extending into said retainer member; a top foil having a trailing edge tab and a leading edge tab; wherein the trailing edge tab is disposed in the trailing edge tab slot; wherein the leading edge tab is disposed in the leading edge tab slot; a backup support structure positioned between and at least partially defined by said top foil trailing edge tab slot and said top foil leading edge tab slot, and said backup support structure integral to said retainer member; whereupon, in the absence of rotation of the rotatable member, the trailing edge tab is in contact, at an initial contact pressure, with the backup support; whereupon, during rotation of the rotatable member, the trailing edge tab is urged into increased contact, at a subsequent contact pressure higher than the initial contact pressure, with the backup support.

In another aspect of the present invention, an apparatus comprises a top foil having a first segment and a second segment; wherein the first segment includes a top foil trailing edge tab; wherein the trailing edge tab includes a trailing edge tab distal end and a trailing edge tab opposite end; wherein the second segment includes a top foil leading edge tab; a retaining system coupled with said top foil and configured to at least partially enclose a rotatable member, said retaining system having a backup support structure, a trailing edge tab slot, and a leading edge tab slot; wherein the trailing edge tab is disposed in the trailing edge tab slot; wherein the leading edge tab is disposed in the leading edge tab slot; whereupon a friction force to the first segment urges only the trailing edge tab opposite end into increased contact, at an increased contact pressure, with the backup support structure.

In a further aspect of the present invention, a method of supporting a rotatable member comprises the steps of installing a compliant assembly in a retaining system to form a journal foil bearing, said retaining system including a retainer member; installing a top foil within said journal foil bearing, the top foil having a portion positioned adjacent the rotatable member; wherein the portion includes a tab having a distal end and an opposite end; installing the rotatable member in said retainer member within said journal foil bearing; and rotating said rotatable member to form a pressurized fluid film between said rotatable member and said compliant assembly such that only the opposite end of the tab of the top foil that is positioned adjacent the rotatable member is urged into increased contact, at an increased contact pressure, with the retainer member to minimize bending moment and stress in the top foil during rotation of the rotatable member These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide high strength foil journal bearing retainers. Embodiments of the present invention may find beneficial use in industries such as aerospace. Embodiments of the present invention may be useful in applications including auxiliary power units (APU) and air cycle machines (ACM). Embodiments of the present invention may be useful in any foil bearing application including, but not limited to, cryogenic turborotors, turbochargers, air conditioning machines, gas turbine engines, motor driven compressors, fans, blowers, turboalternators, and turbogenerators.

Figure 1:
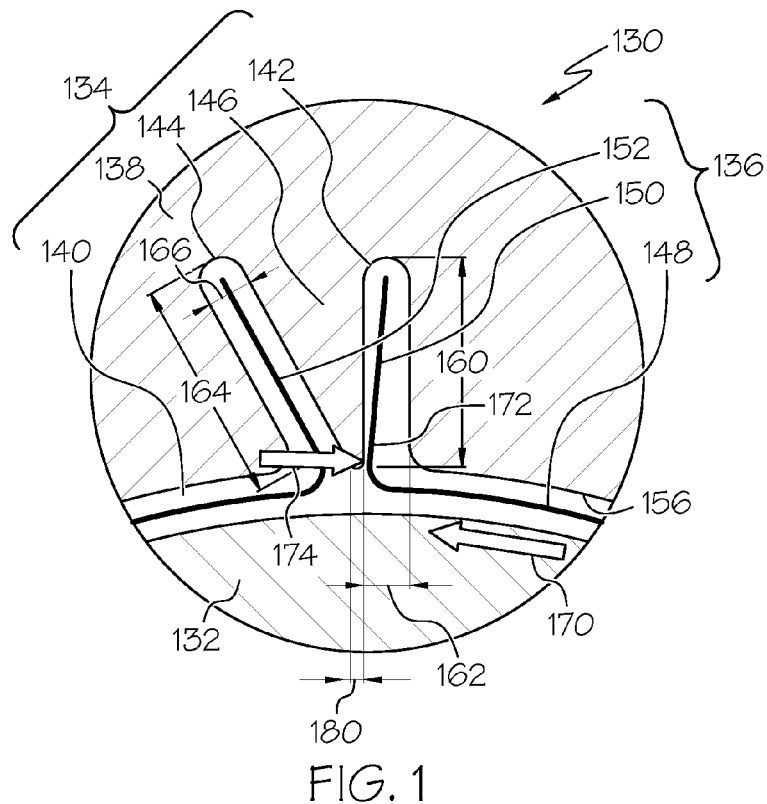
FIG. 1 is a cross sectional view of a portion of a foil journal bearing according to one embodiment of the present invention.
Figure 2:
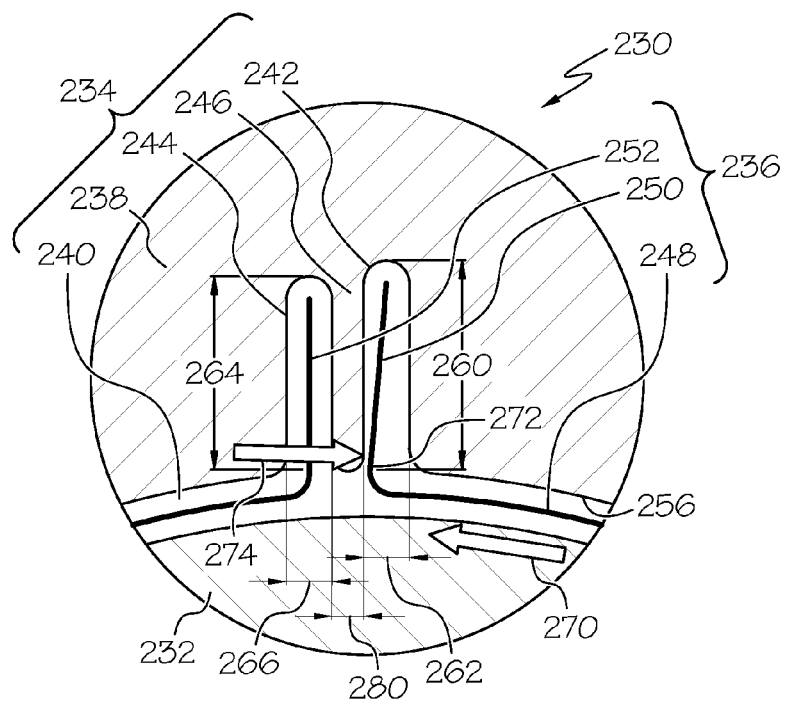
FIG. 2 is a cross sectional view of a portion of a foil journal bearing according to another embodiment of the present invention.

A journal foil bearing 130, according to an embodiment of the present invention, is shown in FIG. 1. The journal foil bearing 230, according to another embodiment of the present invention, is shown in FIG. 2. Referring to FIGS. 1 and 2, the journal foil bearing 130, 230 may be configured to support a rotatable member 132, 232 such as a shaft. The journal foil bearing 130, 230 may include a retaining system 134, 234 and a compliant assembly 136, 236.

The retaining system 134, 234 may include a retainer member 138, 238, an opening 140, 240, a top foil trailing edge tab slot 142, 242, a top foil leading edge tab slot 144, 244 and a backup support structure 146, 246. The terms "leading" and "trailing" may be defined with reference to the direction of rotation of the rotatable member 132, 232. For example, in FIGS. 1 and 2, if the rotatable member 132, 232 rotates counterclockwise the trailing edge tab slot 142, 242 may have a portion to extend towards the right side of the figure and the top foil leading edge tab slot 144, 244 may have a portion to extend towards the left side of the figure. The compliant assembly 136, 236 may include a top foil 148, 248 having a top foil trailing edge tab 150, 250 and a top foil leading edge tab 152, 252. The compliant assembly 136, 236 also may include a spring foil (not shown) disposed between the top foil 148, 248 and the retainer member 138, 238 to accommodate deflections of the top foil 148, 248. For some embodiments, the compliant assembly 136, 236 also may include an under foil (not shown) disposed between the top foil 148, 248 and the spring foil for additional support.

The retainer member 138, 238 may comprise a base structure having an inner surface 156, 256 that may define the opening 140, 240. For some embodiments, the retainer member 138, 238 may comprise metal. The opening 140, 240 may extend through the retainer member 138, 238 and may be configured to receive and to at least partially enclose the rotatable member 132, 232. For some embodiments, the opening 140, 240 may be cylindrical.

The top foil trailing edge tab slot 142, 242 may comprise a slot extending outward from the opening 140, 240 and into the retainer member 138, 238. For some embodiments, the top foil trailing edge tab slot 142, 242 may be formed by electrical discharge machining (EDM), extrusion, casting, or broaching.

The top foil trailing edge tab slot 142, 242 may be configured to receive the top foil trailing edge tab 150, 250. The dimensions of the top foil trailing edge tab slot 142, 242 may vary and may depend on the dimensions of the top foil trailing edge tab 150, 250 and on the application. For some embodiments, the top foil trailing edge tab slot 142, 242 may have a trailing slot depth 160, 260, as measured outward from the opening 140, 240 and through the trailing edge tab slot 142, 242, of between about 0.02 inch and about 0.5 inch. For some embodiments wherein the opening 140, 240 is cylindrical, the trailing slot depth 160, 260 may be less than about 25% of the diameter of the opening 140, 240. For some embodiments, the top foil trailing edge tab slot 142, 242 may have a trailing slot width 162, 262, as measured perpendicular to the trailing slot depth 160, 260, of between about 0.005 inch and about 0.5 inch.

The retaining system 134, 234 may include at least one top foil trailing edge tab slot 142, 242. For some embodiments, the retaining system 134, 234 may include a plurality of top foil trailing edge tab slots 142, 242. For example, when the top foil 148, 248 is a segmented top foil comprising three foil segments, each foil segment subtending a circumferential segment of the inner surface 156, 256 and including a top foil trailing edge tab 150, 250, the retaining system 134, 234 may include three top foil trailing edge tab slots 142, 242.

The top foil 148, 248 may include no segments or any number of foil segments, and the retaining system 134, 234 may include any number of top foil trailing edge tab slots 142, 242. The top foil 148, 248 may be an un-segmented top foil or a segmented top foil and may comprise a plurality of foil segments, each foil segment subtending a circumferential segment of the inner surface 156, 256 and including a top foil trailing edge tab 150, 250.

The top foil leading edge tab slot 144, 244 may include a slot extending outward from the opening 140, 240 and into the retainer member 138, 238. For some embodiments, the top foil leading edge tab slot 144, 244 may be formed by EDM or by extrusion casting, or broaching processes.

The top foil leading edge tab slot 144, 244 may be configured to receive the top foil leading edge tab 152, 252. The dimensions of the top foil leading edge tab slot 144, 244 may vary and may depend on the dimensions of the top foil leading edge tab 152, 252 and on the application. For some embodiments, the top foil leading edge tab slot 144, 244 may have a leading slot depth 164, 264, as measured outward from the opening 140, 240 and through the leading edge tab slot 144, 244, of between about 0.02 inch and about 0.5 inch. For some embodiments, the leading slot depth 164, 264 may be less than about 25% of the diameter of the opening 140, 240. For some embodiments, the top foil leading edge tab slot 144, 244 may have a leading slot width 166, 266, as measured perpendicular to the leading slot depth 164, 264, of between about 0.005 inch and about 0.5 inch.

The retaining system 134, 234 may include at least one top foil leading edge tab slot 144, 244. For some embodiments, the retaining system 134, 234 may include a plurality of top foil leading edge tab slots 144, 244. For example, when the top foil 148, 248 is a segmented top foil comprising three foil segments, each foil segment subtending a circumferential segment of the inner surface 156, 256 and including a top foil leading edge tab 152, 252, the retaining system 134, 234 may include three top foil leading edge tab slots 144, 244.

The top foil 148, 248 may include any number of foil segments and the retaining system 134, 234 may include any number of top foil leading edge tab slots 144, 244. The top foil 148, 248 may be a segmented top foil and may comprise a plurality of foil segments, each foil segment subtending a circumferential segment of the inner surface 156, 256 and including a top foil leading edge tab 152, 252.

For mistake proof installation, the leading slot depth 164, 264 may be greater than or less than the trailing slot depth 160, 260, as better seen in FIG. 2. In other words, the leading edge tab slot 144, 244 and the trailing edge tab slot 142, 242 may have depths of unequal magnitude. For some applications, the top foil leading edge tab slot 144 may be canted, as shown in FIG. 1, to reduce installation errors.

For some embodiments, the leading slot width 166, 266 may be greater than the trailing slot width 162, 262 to prevent or reduce contact between the top foil leading edge tab 152, 252 and the retainer member 138, 238. For some applications, the leading slot width 166, 266 may be less than the trailing slot width 162, 262.

For some embodiments, a distance 180, 280 between the leading edge tab slot 144, 244 and the trailing edge tab slot 142, 242, as measured along the inner surface 156, 256, may be less than about 0.5 inch. For some embodiments, the distance 180, 280 between the leading edge tab slot 144, 244 and the trailing edge tab slot 142, 242 may be between about 0.005 inch and about 0.5 inch. For some embodiments, the distance 180, 280 between the leading edge tab slot 144, 244 and the trailing edge tab slot 142, 242 may be less than about 0.005 inch.

The backup support structure 146, 246 may be integral to the retainer member 138, 238. The backup support structure 146, 246 may be at least partially defined by the top foil trailing edge tab slot 142, 242 and the top foil leading edge tab slot 144, 244. The backup support structure 146, 246 may extend circumferentially between the top foil trailing edge tab slot 142, 242 and the top foil leading edge tab slot 144, 244.

During operation, the backup support structure 146, 246 may increase bearing strength by reducing bending stress of the top foil 148, 248. Rotation of the rotatable member 132, 232 may produce a friction force 170, 270 that may urge the top foil 148, 248 circumferentially in the direction of rotation.

During operation, the top foil trailing edge tab 150, 252 may be urged toward the backup support structure 146, 246. In some embodiments, a portion 172, 272 of the top foil trailing edge tab 150, 252 that is positioned adjacent the rotatable member 132, 232 may be out of contact with the backup support structure 146, 246, in the absence of rotation of the rotatable member. The support structure 146, 246 may then be urged into contact, with the backup support structure 146, 246, when the rotatable member is rotating, as shown in FIGS. 1 and 2. In other embodiments, the portion 172, 272 may be in contact, at an initial contact pressure, with the backup support structure 146, 246, when the rotatable member is not rotating. When the rotatable member is rotating, the portion 172, 272 may then be urged into increased or greater contact, at a subsequent contact pressure higher than the initial contact pressure, with the backup support structure 146, 246.

Contact between the backup support structure 146, 246 and the portion 172, 272 of the top foil trailing edge tab 150, 250 that is positioned adjacent the rotatable member 132, 232 may provide a reaction force 174, 274 at a position close to the friction force 170, 270. The top foil trailing edge tab 150, 250 may be configured to be urged toward the backup support structure 146, 246 such that the portion 172, 272 that is positioned adjacent the rotatable member 132, 232 is urged into initial or increased contact with the backup support structure 146, 246 during operation (e.g. rotation of the rotatable member 132, 232), thereby minimizing bending moment and metal stress in the top foil 148, 248.

The compliant assembly 136, 236, which may comprise thin sheet metal, may be disposed radially outward from the rotatable member 132, 232 and may be configured to be in operational communication with a pressurized fluid film (not shown). For some embodiments, the fluid film may comprise air. The fluid film may comprise any viscous fluid. For example, the fluid film may comprise fluids, such as but not limited to, liquid or gaseous hydrogen, oxygen, and refrigerants.

The compliant assembly 136, 236 may be coupled to the retainer member 138, 238. The top foil trailing edge tab 150, 250 may be configured to be installed in the top foil trailing edge tab slot 142, 242. The top foil leading edge tab 152, 252 may be configured to be installed in the top foil leading edge tab slot 144, 244.

For some embodiments including the spring foil, the leading edge and/or the trailing edge of the spring foil 154, 254 may be coupled to the retainer member 138, 238. For some embodiments including the under foil, the leading edge and/or the trailing edge of the spring foil 154, 254 may be coupled to the retainer member 138, 238.

Figure 3:
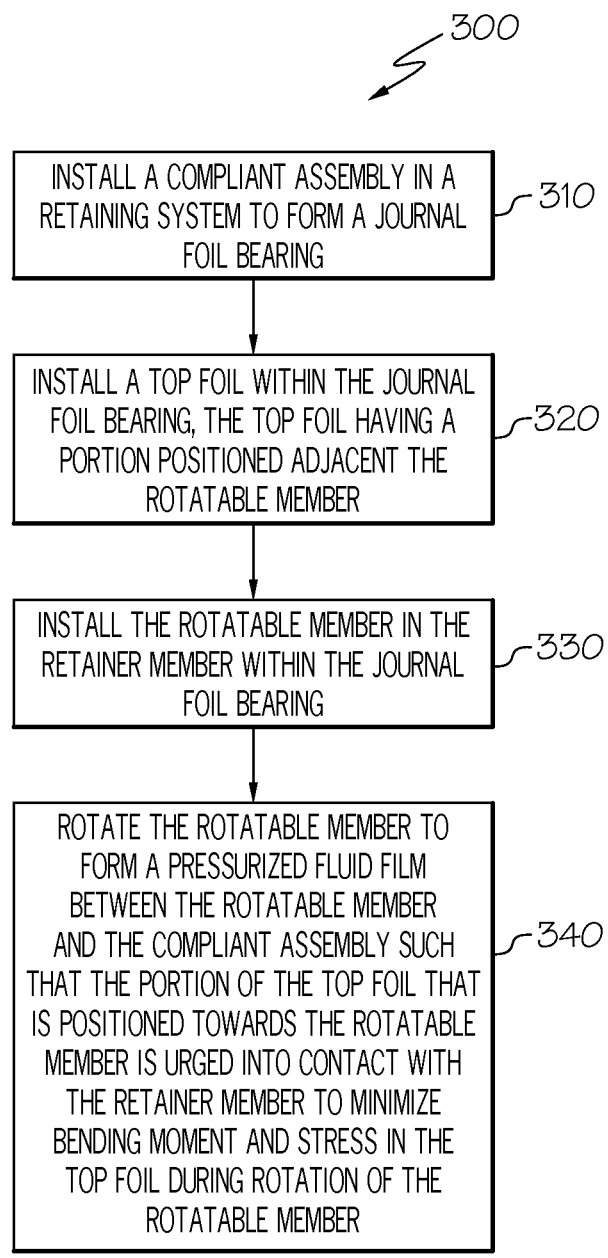
FIG. 3 is a flow chart of a method of supporting a rotatable member according to an embodiment of the present invention.

Referring to FIG. 3, a method 300 of supporting a rotatable member 132, 232 according to one embodiment of the present invention is shown. The method 300 may include a step 310 of installing a compliant assembly 136, 236 in a retaining system 134, 234 to form a journal foil bearing 130, 230, the retaining system 134, 234 including a retainer member 138, 238; a step 320 of installing a top foil 148, 248 within the journal foil bearing 130, 230, the top foil 148, 248 having a portion 172, 272 positioned adjacent the rotatable member 132, 232; a step 330 of installing the rotatable member 132, 232 in the journal foil bearing 130, 230; and a step 340 of rotating the rotatable member 132, 232 to form a pressurized fluid film between the rotatable member 132, 232 and the compliant assembly 136, 236 such that the portion 172, 272 of top foil 148, 248 that is positioned adjacent the rotatable member 132, 232 is urged into initial or increased/greater contact with the retainer member 138, 238 to minimize bending moment and stress in the top foil 148, 248 during rotation of the rotatable member 132, 232 with or without the pressurized fluid film.

The step 310 of installing the compliant assembly 136, 236 in the retaining system 134 234 to form the journal foil bearing 130, 230 may comprise positioning a top foil trailing edge tab 150, 250 of the compliant assembly 136, 236 in a top foil trailing edge tab slot 142, 242 of the retaining system 134, 234 and positioning a top foil leading edge tab 152, 252 of the compliant assembly 136, 236 in a top foil leading edge tab slot 144, 244 of the retaining system 134, 234 such that a backup support structure 146, 246 of the retaining system 134, 234 is positioned between the top foil trailing edge tab 150, 250 and the top foil leading edge tab 152, 252.

The step 330 of installing the rotatable member 132, 232 in the retainer member 138, 238 within the journal foil bearing 130, 230 may comprise positioning the rotatable member 132, 232 radially inward from the compliant assembly 136, 236. For some applications, the step 330 of installing the rotatable member 132, 232 in the journal foil bearing 130, 230 may comprise positioning a shaft of an auxiliary power unit in the journal foil bearing 130, 230. For some applications, the step 330 of installing the rotatable member 132, 232 in the journal foil bearing 130, 230 may comprise positioning a shaft of an air cycle machine in the journal foil bearing 130, 230. For some applications, the step 330 of installing the rotatable member 132, 232 in the journal foil bearing 130, 230 may comprise positioning a shaft of an auxiliary power unit, an air cycle machine, a turbocompressor, a motor driven compressor, a fan, a blower, a turbogenerator, or a turboalternator in the journal foil bearing 130, 230.

The step 340 of rotating the rotatable member 132, 232 to form a pressurized fluid film between the rotatable member 132, 232 and the compliant assembly 136, 236 may comprise rotating the rotatable member 132, 232. The step 340 of rotating the rotatable member 132, 232 to form a pressurized fluid film between the rotatable member 132, 232 and the compliant assembly 136, 236 may include contacting the rotatable member 132, 232 under overload condition resulting in the compliant assembly 136, 236, initially or further contacting the trailing edge tab 150, 250 to the backup support structure 146, 246 at a position close to the friction force produced during operation, thereby minimizing top foil bending stress and improving bearing strength.

As can be appreciated by those skilled in the art, embodiments of the present invention can reduce the bending moment and metal stress in the top foil 148, 248 by incorporating the backup support structure 146, 246 close to the circumferential force vector.

It should be understood, of course, that the foregoing relates to exemplary embodiments of the invention and that modifications may be made without departing from the spirit and scope of the invention as set forth in the following claims.

We claim:

1. An apparatus forming a foil journal bearing comprising:
    a retainer member having an inner surface that defines an opening, said opening configured to receive a rotatable member;
    a top foil trailing edge tab slot extending into said retainer member;
    a top foil leading edge tab slot extending into said retainer member;
    a top foil having a trailing edge tab and a leading edge tab;
    wherein the trailing edge tab is disposed in the trailing edge tab slot;
    wherein the leading edge tab is disposed in the leading edge tab slot;
    wherein said leading edge tab slot and said trailing edge tab slot have depths of unequal magnitude
    a backup support structure positioned between and at least partially defined by said top foil trailing edge tab slot and said top foil leading edge tab slot, and said backup support structure integral to said retainer member;
    whereupon, in the absence of rotation of the rotatable member, the trailing edge tab is in contact, at an initial contact pressure, with the backup support;
    whereupon, during rotation of the rotatable member, the trailing edge tab is urged into increased contact, at a subsequent contact pressure higher than the initial contact pressure, with the backup support.

2. The apparatus of claim 1, wherein said top foil leading edge tab slot is canted.

3. The apparatus of claim 1, wherein a distance between said leading edge tab slot and said trailing edge tab slot is less than about 0.5 inches.

4. The apparatus of claim 1, wherein said top foil leading edge tab slot has a leading slot width, said top foil trailing edge tab slot has a trailing slot width, and said leading slot width is greater than said trailing slot width.

5. The apparatus of claim 1, wherein said retainer member forms the opening in a cylindrical shape and said top foil trailing edge tab slot has a trailing slot depth of less than about 25% of the diameter of said opening.

6. The apparatus of claim 1, wherein said backup support structure extends circumferentially between said top foil trailing edge tab slot and said top foil leading edge tab slot.

* * * * *